(12) United States Patent
Lindborg

(10) Patent No.: US 7,000,634 B2
(45) Date of Patent: Feb. 21, 2006

(54) ADJUSTABLE VALVE FOR VARIABLE FLOWS AND A METHOD FOR REDUCING FLOW THROUGH A VALVE

(75) Inventor: Herman Lindborg, Dalby (SE)

(73) Assignee: Lindinvent AB, Lund (SE)

( * ) Notice: Subject to any disclaimer, the term of this patent is extended or adjusted under 35 U.S.C. 154(b) by 96 days.

(21) Appl. No.: 10/399,361

(22) PCT Filed: Oct. 26, 2001

(86) PCT No.: PCT/SE01/02359

§ 371 (c)(1),
(2), (4) Date: Oct. 3, 2003

(87) PCT Pub. No.: WO02/35157

PCT Pub. Date: May 2, 2002

(65) Prior Publication Data

US 2004/0061087 A1     Apr. 1, 2004

(30) Foreign Application Priority Data

Oct. 26, 2000 (SE) .................................. 00038869
Nov. 14, 2000 (SE) .................................. 00041467

(51) Int. Cl.
*F16K 31/00*     (2006.01)

(52) U.S. Cl. .............................. 137/625.3; 137/625.33; 454/300

(58) Field of Classification Search ............. 137/625.3, 137/625.33; 454/298, 300, 303, 323, 334
See application file for complete search history.

(56) References Cited

U.S. PATENT DOCUMENTS

| 2,367,104 A | | 1/1945 | Demuth ......................... 98/40 |
| RE24,637 E | * | 4/1959 | Wulle .......................... 454/298 |
| 4,316,478 A | * | 2/1982 | Gongwer ...................... 137/14 |
| 4,397,223 A | | 8/1983 | Maxson ......................... 98/40 |
| 5,154,666 A | | 10/1992 | Wapner ....................... 454/290 |
| 6,142,867 A | * | 11/2000 | Lee et al. .................... 454/326 |

FOREIGN PATENT DOCUMENTS

| DE | 2105077 | 8/1972 |
| DE | 3644590 | 7/1988 |
| EP | 0385250 | 9/1990 |
| GB | 553283 | 1/1942 |

(Continued)

*Primary Examiner*—Edward K. Look
*Assistant Examiner*—John K. Fristoe, Jr.
(74) *Attorney, Agent, or Firm*—Myers Bigel Sibley & Sajovec

(57) ABSTRACT

A fluid valve comprises a fluid conduit and a flow reducing device. The fluid conduit includes a fluid input end and a fluid output end. The flow reducing device comprises a first fluid passage and is configured to adjust the width of the first fluid passage. The first fluid passage has a narrow width over an extended flow distance that is delimited by internal walls that cause a pressure gradient in fluid passing through the first fluid passage. The flow reducing device further comprises a second fluid passage having a narrow width over an extended flow distance that is delimited by internal walls. The first fluid passage and the second fluid passage are parallel to each other. The flow reducing device further comprises a plurality of damping elements having surface portions parallel to each other. The facing surface portions of adjacent pairs of said damping elements define the internal walls delimiting the first and second fluid passages.

14 Claims, 10 Drawing Sheets

FOREIGN PATENT DOCUMENTS

| | | |
|---|---|---|
| GB | 1493608 | 11/1977 |
| GB | 2313661 | 12/1997 |
| JP | 2001620569 | 9/1989 |
| JP | 2001221475 | 8/2001 |
| SE | 442669 | 1/1986 |
| SE | 500402 | 6/1994 |
| SE | 513616 | 10/2000 |
| WO | WO 97/18419 | 5/1997 |

* cited by examiner

ADJUSTABLE VALVE FOR VARIABLE FLOWS AND A METHOD FOR REDUCING FLOW THROUGH A VALVE

RELATED APPLICATIONS

The present application is a 35 U.S.C. §371 national phase application of PCT International Application No. PCT/SE01/02359, having an international filing date of Oct. 26, 2001, and claiming priority to Sweden Patent Application No. 0003886-9, filed Oct. 26, 2000, and Sweden Patent Application No. 0004146-7, filed Nov. 14, 2000, the disclosures of which are incorporated herein by reference in their entireties. The above PCT International Application was published in the English language and has International Publication No. WO 02/35157 A1.

FIELD OF THE INVENTION

The present invention relates to a valve for variable flows, and particularly to a valve adapted to provide air-flows within a wide flow range, with limited generation of noise.

BACKGROUND

Many properties, for instance private houses and offices, are today devised with built-in ventilation systems in order to provide a better in-door climate for the residents and employees. In many present ventilation systems the air-flow is however the same independent of the need for ventilation, that is independent of if e.g. a room is filled with people or not. These ventilation systems therefor cause unnecessary consumption of energy and raised energy costs. In order to satisfy the demands of the future of lowered energy costs the air-flow has to be reduced extensively when few or no people are present, and be able to work with high flows when many people are present. The ventilation system therefore has to be devised with valves capable of within a wide flow range, without causing disturbing noise for that reason. The flow has to be adjusted to the real need for ventilation but at the same time satisfy the hygiene limits regarding temperature, $CO_2$ concentration, draft and a low sound level. By providing cooled air (16–17° C.) in a way that does not cause a resulting draft, in combination with controlling of the energy supply to heat radiators at the windows means that it is possible to obtain an optimal solution for the in-door climate throughout the year. This way excess heat from people, computers and incoming sunlight can be controlled without the need for cooled baffles or large amounts of air. This brings about that supply air terminals must be able to spread the cooled air in a way that does not cause a draft and does not cause the sound level to exceed given limits when the flow is reduced to a minimum of a few liters per second.

Among the ventilation systems known today there is no system capable of meeting the requirements above. In many ventilation systems the air-flow is adjusted for instance by means of a conventional damper, such as a throttle valve. When reducing the air-flow in these systems a significant pressure difference occurs over a very short distance at the edge of the plate, which gives rise to a considerable amount of turbulence, i.e. a powerful sound is generated over the edge of the plate. In order to lower the sound level in the room to an acceptable level, i.e. to approximately 30 dB(A), a silencer is therefore needed. Furthermore, a throttle damper cannot reduce the air-flow efficiently since there will be a small open gap between the plate and the housing of the damper even in a closed state. There are throttle dampers arranged with a rubber sealing but these are not advantageous to use since they demand actuators with high torque.

If a conventional supply air terminal, devised for stationary flows, is used together with a throttle damper in order to obtain ventilation adaptable to the current need using cooled air, the air-speed in the terminal would be so low at small flows that a cold air dropping effect will occur, i.e. that air pours out of the ventilation system without being spread in an adequate manner in the room. This is a problem for instance in certain conference installations were conference participants placed in the vicinity of the ventilation device experience that cold air is blown upon them, whereas participants located at a distance from the device will not experience any ventilation at all. Consequently, this is an effect of the air not being spread in an optimum way.

The need for cooling work facilities has increased enormously during recent years, which has led to the repeated braking of energy consumption records during the summer months. Even during the other parts of the year the need for cooling is considerable due to the ever increasing use of computers and other electronic equipment. The most common way of controlling the indoor temperature has been to use heat elements and cooling baffles in places with high requirements on temperature stability. Fancoil, a cooling device with a built-in fan is another solution. These solutions demand that a supply system for a circulating cooling medium is arranged in the facility, which is both energy demanding and brings about a high investment cost. Another way of solving the cooling need is to supply cooled air. This puts a high demand on the mixing in of the cooled air into the present warmer air in the room, so that a cold draft does not result. Furthermore, the flow of cool air has to be varied in relation to the existing need, so that the room does not get too cold. A supply air terminal for this purpose hence has to be able to increase and reduce the flow without causing cool air to simply drop down, as previously explained. Because of these difficulties in the prior art to cope with these demands, it has only been possible to supply input air which is a few degrees cooler than the ambient room temperature. Because of this, large amounts of air need to be supplied in order to obtain a sufficient cooling effect, which in turn means that the ducts or conduits of the entire ventilation system has to be dimensioned thereafter. Furthermore, it has not been possible to reduce the flow to a desired extent of only a few liters per second due to the resulting dropping cold air and damping noise.

One example of the prior art technique is shown in FIG. 1. The valve in this device comprises a tube 1 with a conduit 2 for input of air, preferably arranged with an output orifice 3 at a ceiling 4. A flow reducing device 5 is further devised with a surface 6 facing a orifice 3 of the tube. The supply flow of air through the tube 1 mainly occurs in the directions of arrows a and b. The air-flow is adjusted by raising or lowering the flow reducing device 5, which is illustrated by the bi-directional arrow in the figure, for opening of the gap between the surface 6 and the orifice 3. A dashed line in the figure illustrates that the flow reducing device 5 in some way is fixed to the tube 1 or to the ceiling 4, and is adjustable in different height positions. Actuators for adjusting the air-flow can be applied with some form of driver means, wherein the position preferably is adjusted by means of pneumatics under control of mechanical temperature sensors. In a simpler embodiment the actuator can be manually adjustable, for instance constituted by a screw in an oblong hole.

A disadvantage with the solution according to FIG. 1 is that, as with a throttle damper, or an iris damper for that matter, reduction is achieved in one point, or rather at the verge of the orifice 3. A large reduction with very small air-flows, i.e. when the plate is upraised, therefore brings about an increased sound level because of the turbulence which is formed alongside the edges of the orifice 3 during the powerfull pressure change. In order to avoid this the distance between the tube 1 and the flow reducing device 5 is usually limited by use of spacers, wherein the air-flow cannot be completely reduced. Hence, the air-flow cannot be completely adjusted based on the need for ventilation, wherein it is hard to obtain the desired saving effects.

Another disadvantage with the device according to FIG. 1 is that a flow regulation is carried out with a pressure from a supply air acting towards the adjustable flow reducing device 5. When reducing the flow, i.e. when the flow reducing device 5 is brought towards the orifice 3, the flow reducing device will hence work towards the air pressure present in the air conduit in the tube 1, caused by both static and dynamic pressure. This means that a certain force will be needed for reducing the flow, and that for dynamic adjustment an engine is needed which engine is devised such that it is capable of exercising the necessary work. However, it is desirable that said engine is as quite as possible, since it is placed inside an office facility or the like, and is adjusted dynamically dependent on certain given parameters. At the same time, one realises that the higher work the engine has to exercise, the more sound is generated.

SE 442669 discloses a supply air terminal wherein a cone-shaped flow reducing device is arranged to be brought closer or farther away from an inlet tube opening for the purpose of regulating the flow. The disclosed solution uses the same principles as the prior art according to FIG. 1, and hence suffers from the same drawbacks.

DE 2105077 relates to a self-regulating valve for constant flows, adapted to compensate for variations in the input air pressure. A spring mechanism is used such that in case of a pressure drop in the input air the damper opening is regulated in order to help maintain a steady flow.

SE 516616 discloses an air distributor, devised to be manually operated to direct the divergence of the output beam of air. A blade ring is mounted in a stationary position in relation to an outermost tube which includes a collar. In the air distributor there is a displaceable separate cylinder pipe which is used for guiding air and which can be brought into different regulation positions in relation to the stationary blade ring. The apparatus is not devised for, nor capable of, regulating the output flow, but is devised to control the divergence of the output beam by displacing the separate cylinder pipe such that a variable portion of the input air is passed through the blade ring, an a complementing portion is passed outside the separate cylinder pipe.

Another problem associated with ventilation systems of the prior art is the implementation of fire dampers. In order to prevent smoke and hot gases from spreading in the ventilation system, causing damage or potentially spreading a fire, basically every ventilation system of today is devised with some form of shut-off function in the form of fire dampers. Therefore, both a flow regulating device and a fire damper is usually located in the same duct, since no satisfying solution to combine the two has been provided. A fire damper must be capable of completely closing off the duct, which means that if a throttle valve is used it has to be provided with a rubber sealing around its damper blade. The drawbacks of such a device are many due to the friction caused. Both the rubber sealing and the actuator, which is often exercised every day in order to check its function, will become worn out prematurely, and the closing speed of the fire damper will be slow due to the dry friction.

U.S. Pat. No. 4,397,223 relates to a reciprocating actuator for a valve in the form of an air diffuser. The actuator is devised to react to fire or high heat, and to close the valve in such case. Since the spring used to close the valve in case of the aforementioned situations has to work against the air pressure in the connecting pipe, a latch mechanism has been provided to prevent the valve from opening in case the pressure exceeds the closing force of the spring.

U.S. Pat. No. 2,367,104 describes an air distributor having a damper construction with two flat cones for distributing air supplied from the device. A first cone is used as a damper for reducing the air flow by adjustment of the output opening of the device. The other cone is not passed by the output air, but merely uses the speed of the output air to suck air present in the room through the space between the two cones, in order to cause an injection of the fresh air with the present air.

The present invention relates to a valve which fulfils the requirements above and which does not display the disadvantages associated with the prior art.

SUMMARY OF THE INVENTION

Consequently, the invention relates to a fluid valve for variable flows of for example air, comprising a tube with an input opening and an output opening, a flow reducing device having a damping surface facing said output opening for adjustment of the air flow through said tube, and an actuator for variable adjustment of the distance between the damper surface of flow reducing device and said output opening. The tube has an outer damper flange, projecting from said output opening. Said damper flange preferably has a flange surface extending between the edge of the output opening of the tube and the outer edge of the damper flange, wherein a flow distance having a given height is defined between the limiting surfaces constituted by said flange surface and said damper surface. In one embodiment said flange surface and said damper surface are substantially parallel, alternatively the distance between said flange surface and said damper surface decreases from the edge of the output end to said outer edge.

At large damping the height between the damper surface and the flange is small, particularly in relation to the length of said flow distance, and thereby a retardation of the air flowing there through is obtained over an extended section. Therewith, a pressure reduction is obtained which yields minimum generation of sound, particularly in comparison with simple dampers where basically the entire pressure reduction is obtained over an edge.

In one embodiment the valve comprises a damper disc with a central recess, which damper disc is arranged substantially parallel between the flange and the flow reducing device in order to delimit a portion of said given height, and means for limiting the height of the delimited portion to a predetermined maximum height. In one embodiment, where the valve has a circular cross section said damper disc is preferably ring-shaped, wherein said recess forms an inner diameter preferably corresponding to or exceeding the inner diameter of tube, whereas the outer diameter of the damper surface essentially corresponds to the diameter of the flange.

At a flow setting where said given height is smaller than said maximum height, said damper disc is placed adjacent one of said limiting surfaces, either directly against the flange or the flow reducing device, or against one or a couple of additional damper discs. At a flow setting where said given height is larger than said maximum height, said damper disc is placed at said maximum height from said one of said limiting surfaces.

Preferably a plurality of damper discs are arranged in parallel between the flange and the flow reducing device in order to delimit each one portion of said given height, and means are provided for limiting the height for each delimited portion to said maximum height. Theses means for limiting the height of the delimited portions preferably includes collapsing suspension means mounted to said flange.

The advantage with this arrangement is that the valve's total opening with height y will be constituted of one or more sub openings with a maximum height x, where each sub opening has its own narrow flow distance. Hence, the extended pressure reduction will be obtained regardless of the size of the opening of the valve, wherein a minimum sound generation is obtained independent of the flow setting.

In the valve according to the present invention said tube comprises a dynamic tube member with open ends, slideably arranged concentrically with a stationary tube member, wherein said actuator is devised to displace said dynamic tube member along the stationary tube member for adjustment of the distance between said output opening and said damper surface.

An advantage with the valve according to this embodiment is that it needs very small actuator forces, since the element which is moved upon opening and closing of the valve is a tube member with open ends which is displaced in its axial direction. Thereby the air pressure will only work radially outwards against the envelope surface of the tube member, but will not counteract the movement of the tube member. Therewith a small engine can be used with a low input effect so that it will operate quietly and with small power consumption.

Preferably said flow reducing device is arranged with spacer bars on a fixed distance from said stationary tube member.

BRIEF DESCRIPTION OF THE DRAWINGS

The present invention will be described in greater detail below with reference to the accompanying drawings, in which.

DETAILED DESCRIPTION OF PREFERRED EMBODIMENTS

The present invention relates to a valve for variable air flows which is capable of reducing the air-flow with minimum sound generation.

Figure 1:
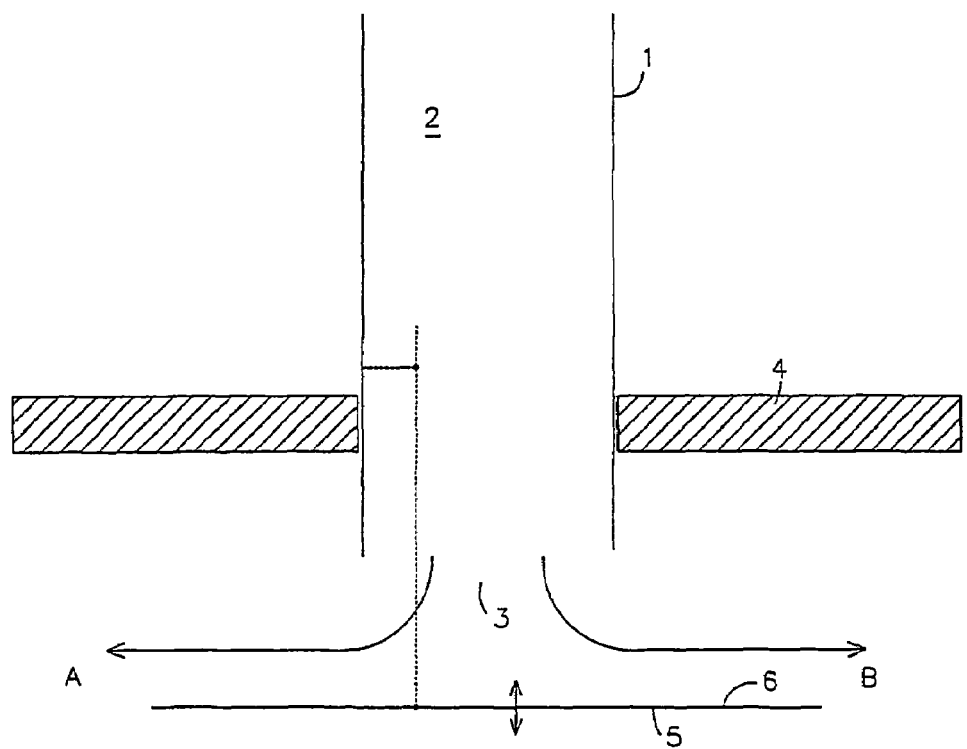
FIG. 1 shows a valve for variable flows according to the prior art.
Figure 2A:
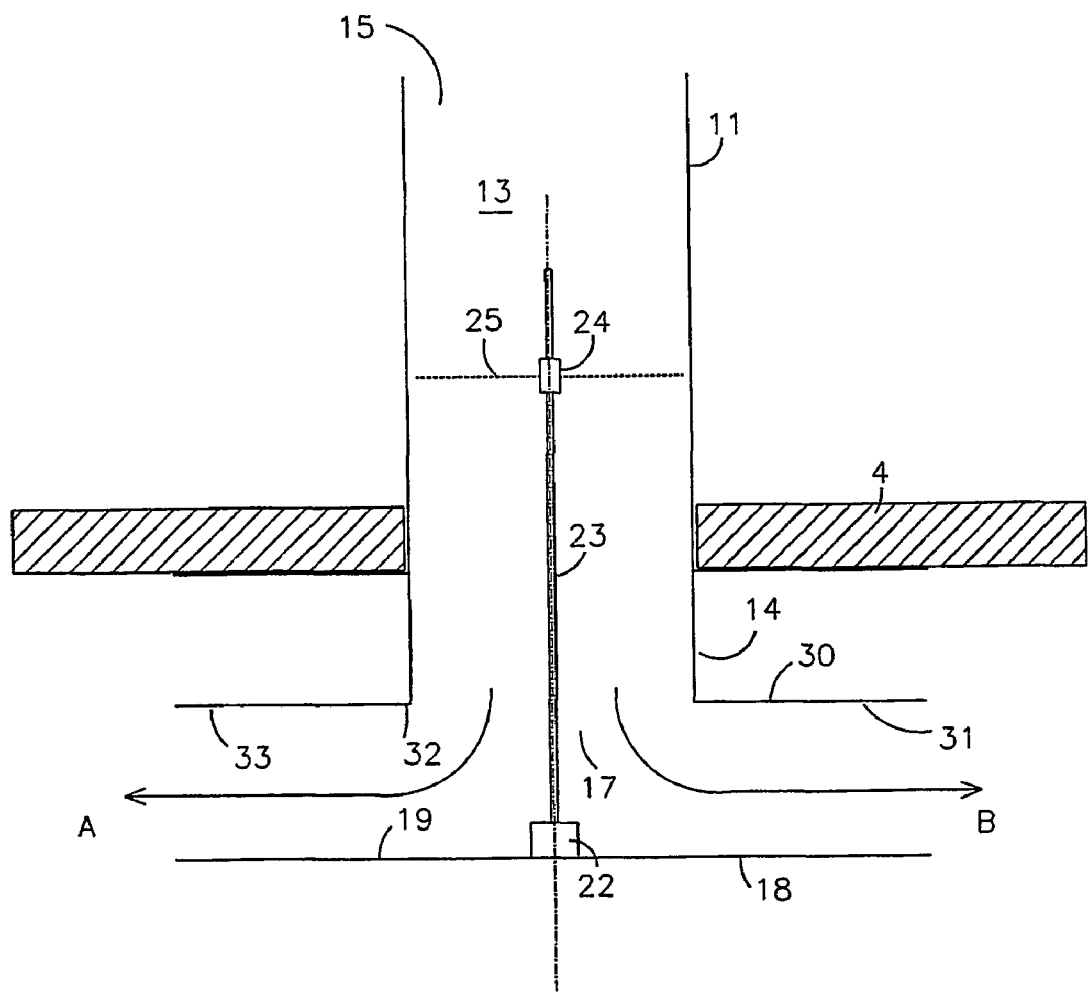
FIG. 2A shows an embodiment for a valve for variable flows according to the present invention.

In FIG. 2A a valve according to the present invention is shown, comprising a tube 11 arranged e.g. at the ceiling 4 of a room, which tube 11 forms a conduit 13 for flow of air. The tube comprises a first stationary tube member 11, preferably firmly arranged towards said ceiling 4 at the first open end 14 of the tube member. The stationary tube member has an open output opening 17 at the first end 14. An open input opening 15 is arranged at the second end of the tube member 11, arranged for connection to a ventilation system (not shown) for supply of air. Hence, the valve is devised for flow of air from said input end 15, through the conduit 13, and out through said output opening 17. Furthermore, the valve comprises a flow reducing device 18 for regulation of the air flow out from the tube 11. Said flow reducing device 18 displays a surface 19 towards said output opening 17 of the tube 11. The surface 19 will hence force air from the tube 11 to flow out sideways in the direction of the arrows A and B wherein the ventilation air will be guided out and spread in the room. It should be noted that the tube 11 and flow reducing device 18 in the valve according to the present invention each has a certain cross section, though not evident from the figure, and that the valve can be arranged for discharge of air through the entire circumference of the opening of said output opening 17. The cross section is preferably circular, but may of course just as well be triangular, square or of any other shape. The flow reducing device and the output opening 17 of the tube 11 are displaceable towards and away from each other, i.e. laterally as the valve is illustrated in FIG. 2A, for regulation of the air flow. This can be solved in many ways. One way is to arrange a non-adjustable, .i.e. stationary, tube member 11 in the tube, wherein the flow reducing device is movable for setting into different distances from the tube member 11. An alternative is to have the flow reducing device 18 firmly arranged to the ceiling 4, and to have a dynamic tube member 12 displaceable towards or away from the flow reducing device 18. Yet another way is to arrange a portion of the tube 11 in the form of a folded pipe like a bellow, so that said portion can be extracted and pressed together in order to displace the output opening 17 towards the flow reducing device 18. Such a folded portion may be devised between a stationary 11 and a dynamic 12 tube member, or be connected with one of its ends to the output end 14 of a stationery tube 11, such that the second end of the folded portion forms said output opening 17. Other alternatives are discussed below, and they may of course also be combined.

In FIG. 2A and embodiment is illustrated wherein the tube 11 is constituted of a stationary tube member 11, fixed firmly to the ceiling 4 in some undisclosed manner. An actuator for regulation of the air flow is in its simplest embodiment a device arranged for adjusting the distance of the flow reducing device 18 to the output opening 17 of the tube 11. In a simple way this may be achieved by arranging the flow reducing device 18 with protruding elements (not shown) on the damper surface 19, which fits and engages with the inside of the tube 11 with a certain friction, e.g. caused by a rubber coating on the protruding elements or on the inside of the tube 11. The flow reducing device 18 may then be displaced into or out of the stationary tube member 11, e.g. manually, and then be retained in the selected position by means of said friction.

In one embodiment of the valve according to the invention, also shown in FIG. 2A, the actuator is automated and devised with driving means 22 at the flow reducing device 18. Said driving means 22 is arranged to use low speed to achieve a high torque, and is for example constituted by a DC engine, but any other driving means, such as step engine or pneumatic engine may also be used. In the embodiment illustrated in FIG. 2A the driving means 22 of the actuator is devised to displace the flow reducing device 18 in relation to the tube 11 by means of a suitable transmission 23,24,25 for regulation of the flow through the valve. In the illustrated embodiment the transmission of the actuator comprises a rod 23 with an outer thread, which rod extends inside the dynamic tube member 12 along its extension axis, preferably centrally in the conduit 13. Said rod 23 is rotatable by means of said driving means 22. Furthermore, a nut member 24 having an inner thread is arranged centrally in the dynamic tube member 12, preferably connected to the dynamic tube member 12 by means of one or more fixation bars 25 which do not influence the air stream through the conduit 13 in any substantial way. The rod 23 is arranged through the nut member 24 in the threaded engagement. The transmission 23,24,25 is arranged such that rotation of the rod 23 causes rotation of the rod 23 in relation to the nut member 24, rather than rotation of the flow reducing device 18 in relation to the tube 11. Rotation of the flow reducing device 18 may e.g. be prevented by means of said protruding elements engaging with friction with the inner surface of the tube 11. By rotation of the rod 23, by means of the driving means 22 of the actuator, the flow reducing device 18 is thereby brought, through displacement forces acting on the threads of the nut member 24, to be displaced towards or away from the stationary tube member 11. In this way the damping, i.e. the distance between the output opening 17 and the surface 19, is controllable.

In FIG. 2A it is further illustrated how the valve according to present invention is devised with an outer damper flange 30, extending from the tube 11 essentially parallel to the surface 19 of the flow reducing device 18, which damper flange 30 forms a wing on the outside of the output opening 17 of the tube 11. As the tube member 11 and the flow reducing device 18 are displaced towards each other, the angle between the flange surface 31 which the flange 30 faces towards the damper surface 19 of the flow reducing device 18, and said damper surface 19, remains constant regardless of the flow setting. The embodiment including a damper flange 30 extending essentially parallel to the upper surface 19 is based on the inventors' conviction that an optimum flow reduction with a minimum generation of sound is one that is caused by an extended damping, similar to the narrow passage in a hose. In such a narrow passage the constant friction towards the walls of the hose gives rise to a pressure fall between the input opening and the output opening, wherein the pressure falls evenly between said openings. Sharp edges, on the other hand, were a sudden drop in pressure is generated, such as for instance in a throttle valve, lead to substantial turbulence which causes both noise and an under-pressure which counteracts the force which has to be applied on the damper during throttling. By the arrangement with an projecting flange an extended flow distance out of the valve is obtained, which flow distance is mainly defined by the distance between the edge 32 of the inner diameter of the tube 11 at the output opening 17, and the outer edge 33 of the flange 30, alternatively the outer edge of the flow reducing device 18 if the flange extends farther than the flow reducing device 18. For valves were the tube diameter for the tube 11 displays a standard size in the range of 10–40 centimetres, the length of said flow distance is within the range of 1–20 centimetres and preferably between 4–10 centimetres, for example 7 centimetres. Naturally, suitable dimensions of the flange 30 are dependent on the air pressure for which the valve is adapted.

Thanks to the distance between the limiting surfaces 31 and 19 being essentially parallel, or somewhat tapered towards the outer edge 33, a gradual change in the air pressure occurs wherein the air resistance or turbulence is distributed evenly along the entire flow distance with minimum generation of sound as a consequence. This is valid also for a high flow reduction with minimum flow. The embodiment with a tapered flow distance, i.e. were the distance between the surface 31 of the flange 30 and the surface 19 of the flow reducing device 18 decreases outwardly towards the edge 33, is adapted to counteract the radial volume expansion of the flow zone, were said flow zone consequently relates to the entire zone between the surfaces 31 and 19 in three dimensions. Since the surface of the flow zone between 31 and 19 increases with the square of the radius out towards the edge 33, so does the volume if the limiting surfaces 31 and 19 are parallel. This would mean that the pressure fall would not be entirely evenly distributed between the inner edge 32 and the outer edge 33, but be higher towards the inner edge 32. The angle of the flange 30 against the flow reducing device 18 hence counteracts this phenomena. The angle of the flange 30 towards the damping surface 19 is however relatively acute, preferably within the range of 0–20°. It is of course also possible to design the flange somewhat curved in relation to the damper surface 19, so that the angle between them decreases from the inner edge 32 to the outer edge 33, at the same time as the distance between the flange 30 and the damper service 19 decreases.

Figure 2B:
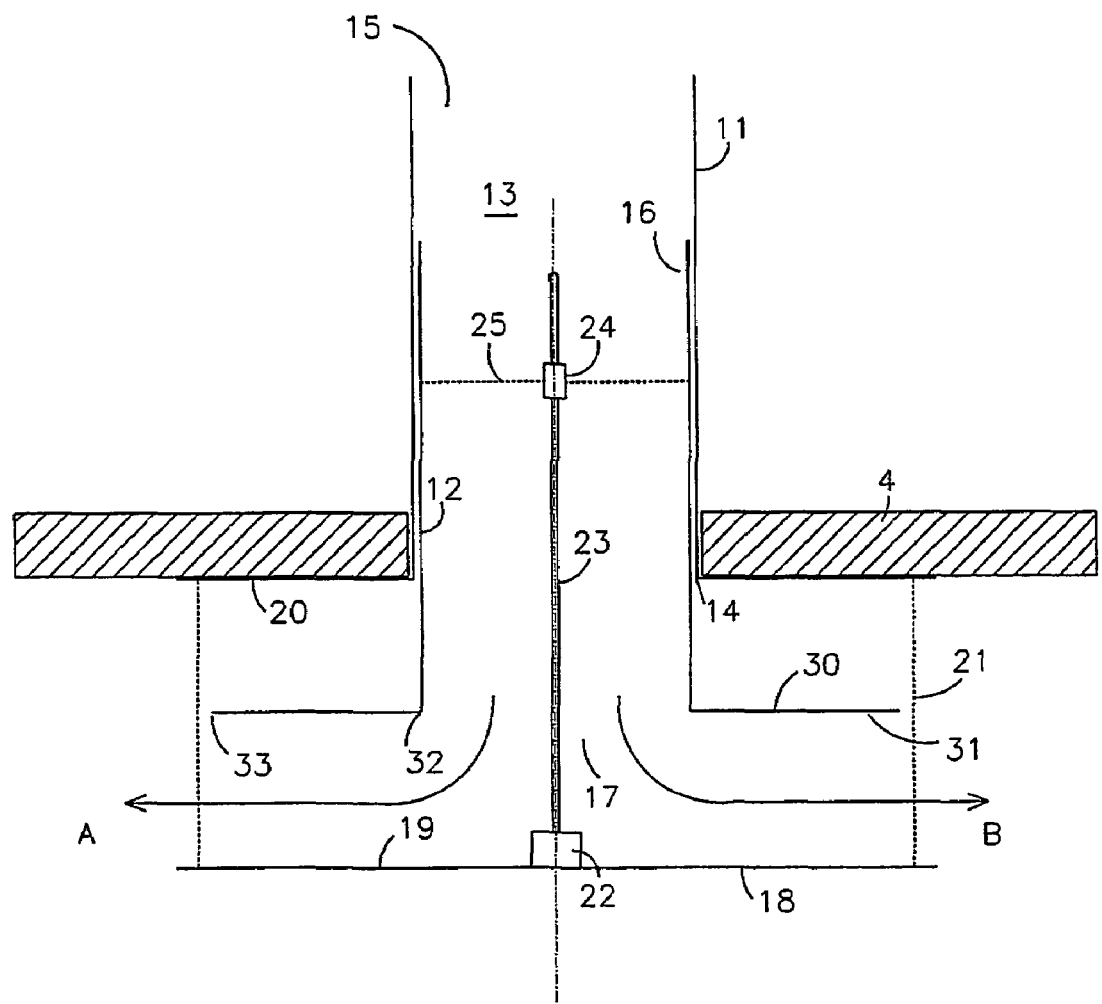
FIG. 2B shows another embodiment for a valve for variable flows according to the present invention.

In FIG. 2B an embodiment of the present invention is illustrated, wherein the flow reducing device 18 is arranged at a fixed distance from the ceiling 4, and where instead the output opening 17 of the tube 11 is displaced towards or away from the flow reducing device 18. In the valve according to this embodiment, said tube comprises a first stationary tube member 11, firmly fixed in relation to the ceiling 4, an further a second, dynamic tube member 12, arranged axially displaceable at the first tube member 11. The flow reducing device 18 is preferably firmly attached to the stationary tube member 11 by means of spacer bars 21, which spacer bars define the maximum distance d which the second displaceable tube member 12 can be displaced out of the stationary tube member 11. As is evident from arrows A and B the spacer bars 21 shall not be seen as hindering the air flow, but rather forming discrete support means.

Preferably the dynamic tube member 12 is arranged inwardly of the first tube member 11, as disclosed in FIG. 2B, therefore having an outer diameter which does not exceed the inner diameter of the stationary tube member 11. In an alternative embodiment the dynamic tube member 12 may however be arranged outwardly of the stationary tube member 11. Said dynamic tube member 12 also includes an input opening 16, facing the same direction as input opening 15 of the stationary tube member, and an output opening 17 turned towards the output opening end 14 of the stationary tube member, respectively. The output end 17 of the dynamic tube member 12, which furthermore constitutes the output end of said tube 11,12, extends outside the output end 14 of the stationary tube member 11 to a different extent in dependence of the damping of the valve. The output end 14 of the stationary tube member is in one embodiment adapted for fixed mounting onto the ceiling, or in a wall. In one embodiment of the valve according to the invention, wherein the dynamic tube member 12 is devised inwardly of the stationary tube member 11, said output end 14 is devised with an outer mounting flange 20, adapted for mounting towards the ceiling or the wall with suitable fastening means, such as screws, rivets, glue or the like.

In the figures showing the present invention the dynamic tube member 12 is drawn at a distance inside the stationary tube member 11 in order to simplify the figure. The radial distance between the tube members 11 and 12 is however as a rule small enough to prevent air passage between the tube members 11 and 12, and at the same time large enough for the dynamic tube member 12 to be easily displaceable in both directions inside the first tube member 11 in a way that provides minimum friction, unless the friction has a purpose of itself according to a previously described embodiment. The embodiment according to FIG. 2B is further arranged with a suitable actuator according to what has been described above.

The flange 30, which according to what has been described in relation to FIG. 2A is devised at the output opening 17, can be manufactured with an outer diameter 33 which runs outside the spacer bars 21, wherein suitable recesses are formed in the flange 30, in which recesses spacer bars 21 are devised to run during flow regulation.

In the valve according to the embodiment with a dynamic tube member 12, the air flow is varied by using an actuator to vary the distance between the output end 17 of the dynamic tube member 12 and the surface 19 of the flow reducing device 18, wherein a linear relation is obtained between the actuator setting and the air flow out of the valve. The present air pressure in the conduit 13 acts radially outwards towards the walls of the dynamic tube member 12. However, apart from certain friction neither the static pressure caused by overpressure in the input air through the input opening 16, nor the dynamic pressure caused by the air flow itself, acts with any force on the dynamic tube member 12 in the axial direction. This means that control of the damping can be made with very little force, which in turn means that both the effect required by driving means 22 arranged for the actuator, and the sound it generates, can be minimised.

Figure 3:
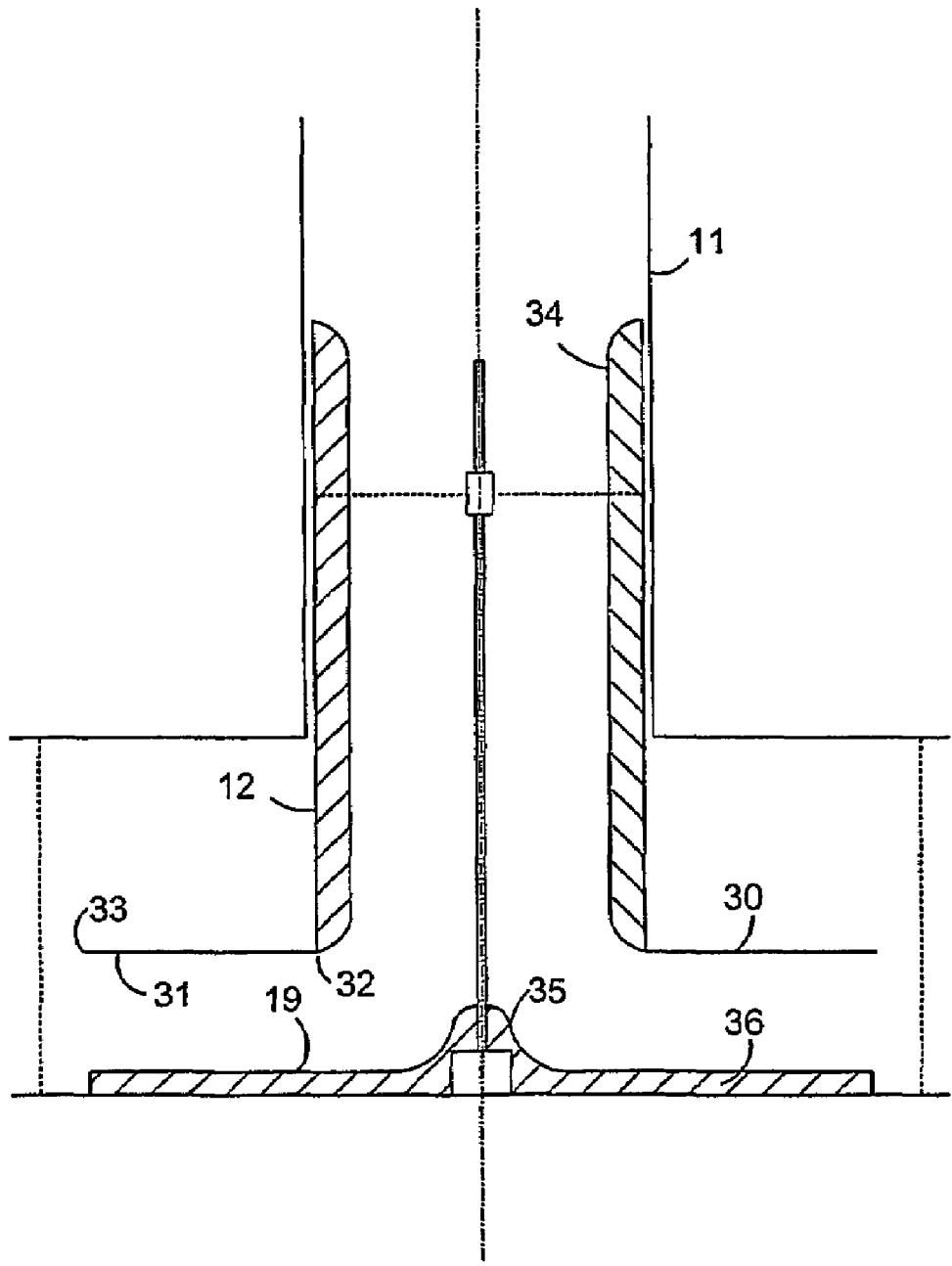
FIG. 3 shows a different embodiment of the valve according to the present invention, devised with a damper flange.

FIG. 3 also displays an embodiment of a stationary pressure reducing element 34, arranged at the inner envelope surface of the dynamic tube member 12. Since it is mounted fixed to the dynamic tube member 12 it is in some sense moveable, but not in such a way that its affects on the pressure reduction is varied as a consequence of the position of the dynamic tube member 12 in relation to the flow reducing device 18. In an embodiment were the dynamic tube member 12 is arranged to run outwardly of the stationary tube member 11, the stationary pressure reducing element 34 is of course preferably arranged on the stationary tube member 11. Characterising for the stationary pressure reducing element 34 is that it defines a predetermined narrowing of the inner cross-section area for the conduit 13, or the inner diameter of the conduit 13 in the case the tube 11,12 is cylindrical, over an extended distance in said conduit 13, whereby the "hose effect" according to the above is obtained. In an embodiment adapted for ventilation tubes of standard sizes in the range of 10–40 cm diameter, the stationary pressure reducing element 34 defines an inner cross section area, which is narrowed from the inner cross section area of the tube 11,12. Preferably the cross section area for the stationary pressure reducing element 34 is 10–80 per cent of the inner cross section area of the tube 11,12, over a distance of 5–50 cm. The dimension which is chosen is dependent on the air pressure of the incoming air to the valve, and which maximum pressure it is desired to have out in the room which the valve supplies with air. The stationary pressure reducing element 34 is further preferably rounded at the flange 30 of the dynamic tube member 12, in such a way that the opening 17 of the dynamic tube member 12 towards the flow reducing device 18 increases gradually. Preferably said rounding off displays a radius which is equal to the thickness of the stationary pressure reducing element 34. Furthermore, in this embodiment the flow reducing device 18 is formed such that the surface 19 has a preferably symmetric raised portion 35, wherein the symmetry axis of the raised portion 35 coincides with the longitudinal axis of the dynamic tube member 12. The stationary pressure reducing element 34 preferably formed of a sound isolating material, such as plastic foam.

In one embodiment a sound isolating carpet 36 is also arranged on the surface 19 of the flow reducing device 18. Said carpet includes, in one embodiment, said raised portion 35 which is adapted to enclose the driver means 22 of the actuator, and which is also formed with a suitable tapered tip adapted to the rounding off of the stationary pressure reducing element 34. Preferably the carpet 36 has a radial extension which essentially coincides with the outer edge 33 of the flange 30.

Figure 6:
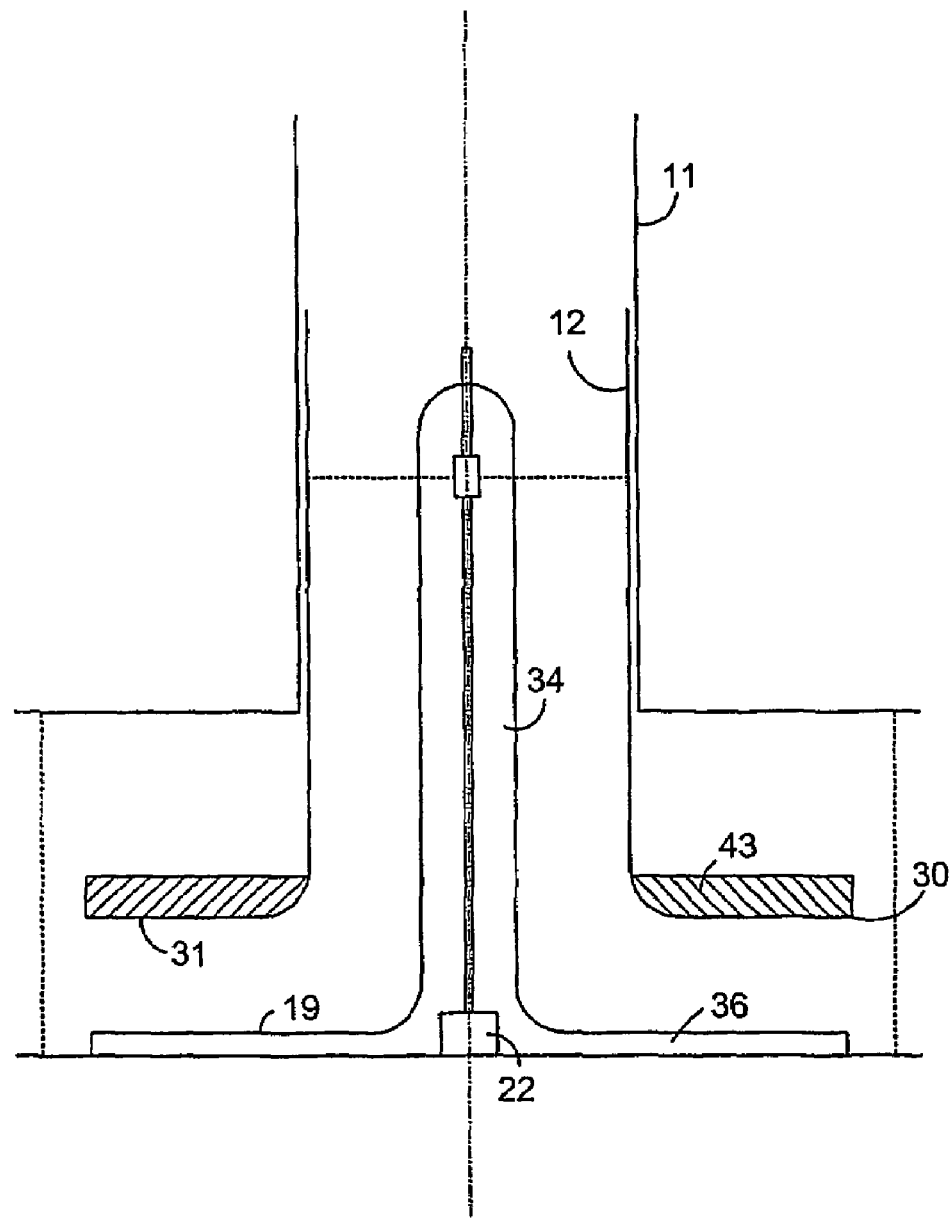
FIG. 6 shows an embodiment of the invention, devised with a stationary pressure reducing element 34 for nominal reduction of the air flow.

In one embodiment, illustrated in FIG. 6, the stationary pressure reducing element 34 is instead arranged at the flow reducing device 18, protruding centrally in the conduit 13 and essentially enclosing the driver means 22 and the rod 23. The nut member 24 of the transmission may in this embodiment be arranged above the pressure reducing element 34, or, as illustrated in FIG. 6, inside. This can be achieved by forming the pressure reducing element 34 in plastic foam or the like, and forming a slot for each fixation bar 25 which makes it possible for the nut member 24 to run in a channel (not shown) under the pressure reducing element 34. Preferably the stationary reducing element 34 is formed with rounded ends according to FIG. 6, and may be integrated with the isolating carpet 36. In this embodiment the stationary pressure reducing element 34 also forms the raised portion which covers driver means 22, corresponding to the raised portion 35 according to previously described embodiments. Also the pressure reducing element 34 according to the embodiment of FIG. 6 defines a narrowed inner cross section area in the conduit over an extended portion of the conduit 13, and therefor causes said hose effect.

The pressure reducing element 34 is thus the static correspondent to the flow distance between the surfaces 19 and 31. At a large opening of the valve, i.e. when the dynamic tube member 12 is displaced far into the stationary tube member 11, the extended flow limitation provided by the pressure reducing element 34 will cause a nominal pressure reduction. At increased flow reduction the contribution to the flow reduction of the wing 30, by being moved closer to the flow reducing device 18, will increase and eventually take over. If the stationary pressure reducing element 34 is formed according to the embodiment of FIG. 6, and also is relatively short in comparison with the distance between the flow reducing device 18 and the stationary tube member 11, the reducing effect which the stationary pressure reducing element 34 has to some extent be dependent of the position for the dynamic tube member 12. One realises though that for a rather extended pressure reducing element 34, for instance were the pressure reducing element 34 is about twice as long as the distance between the flow reducing device 18 and the stationary tube member 11, as illustrated in the figure, the reduction caused therefrom will not be dependent on the position of the dynamic tube member 12 in any significant way, but will only give rise to said nominal reduction. In accordance with the embodiment discussed above the flow reduction caused by the damping of the dynamic tube member 12 towards the flow reducing device 18 will dominate for small valve openings.

The extended flow reducers, comprising a dynamic flow reducer 30 and a static flow reducer 34 are of course separately useable and are both formed for minimum noise generation. In an embodiment were both these are included, such as in FIG. 3, they will define the margin conditions for the valve. The static flow reducer 34 defines the maximum flow through the valve at a pre-determined air pressure of the air supply into the valve. This is defined both by the length of the flow reducer 34 and by the inner cross section area defined by it in the conduit 13, and can thereby be designed based upon the existing need. The dynamic flow reducer 30 defines flow reduction upon damping, and its influence of the flow reduction at a certain valve opening, i.e. the position for the dynamic tube member 12 in relation to the flow reducing device 18, is mainly controlled by the length of the flange 30 from the inner edge 32 to the outer edge 33.

Figure 4:
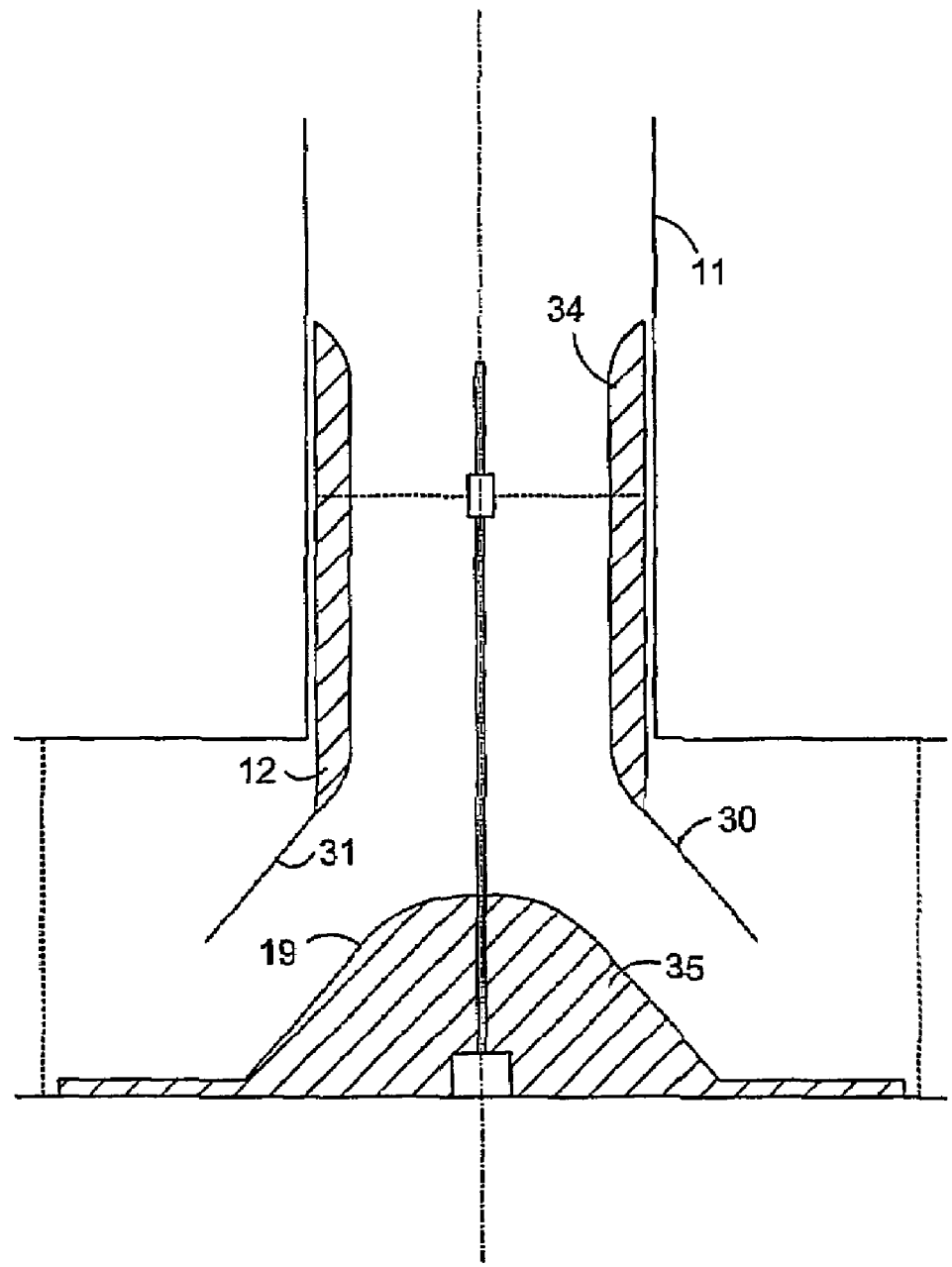
FIG. 4 shows an embodiment of the invention with the funnel-shaped output opening.
Figure 5:
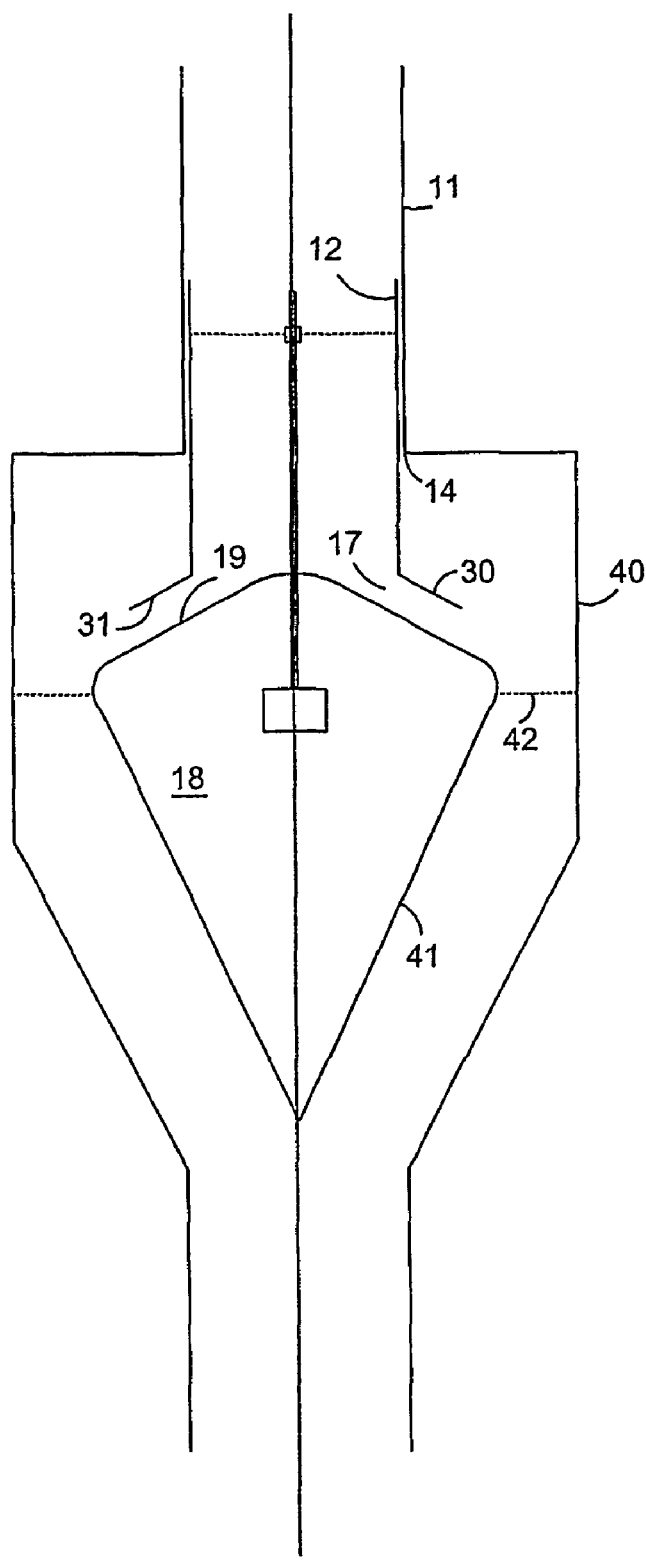
FIG. 5 shows an embodiment of the invention, adapted for mounting between two tubes.

FIG. 6 also illustrates a detail which in the same way can be combined with any of the embodiments illustrated in FIGS. 3–5, namely an isolation device 43 arranged at the flange 30. This isolation device 43 can be used in combination with the carpet 36 or by itself, and is adapted to provide sound isolation for the flow.

In FIG. 4 an alternative embodiment of the invention is shown, having large similarities with the embodiment of FIG. 3. However, the solution according to FIG. 4 differs in the way that the flow reducing flange 30 is devised with an opening angle towards the dynamic tube member 12, which opening angle differs from 90°, so that the output opening 17 forms a funnel with gradually increasing opening. The raised portion 35 on the flow reducing device 18 is further formed in a corresponding way, so that parallelism or a certain angle according to what has been described with reference to FIG. 3, remains between the damper surface 19 of the flow reducing device 18 and the damper surface 31 of the flange 30.

The valve according to the present invention, as embodied in FIGS. 2–4 may advantageously be arranged in the ceiling of a room. The valve is then devised such that the stationary tube member 11 is arranged in a hole in the ceiling such that the mounting flange 20 is arranged in parallel with and on the inside of the ceiling. A valve according to the present invention may however also be used for flow regulation in tubes, wherein no or very little generation of sound occurs. FIG. 5 shows a valve were a second tube 40 is devised tightly to the output end 14 of the stationary tube member 11. In the embodiment illustrated in FIG. 5 the flow reducing device 18 has a surface 19 which is parallel or devised with a certain angle in the previously described manner, with the flange 30 of the dynamic tube member 12. The flow reducing device 18 also has a second surface 41 facing away from the dynamic tube member 12. In FIG. 5 this second surface 41 of the flow reducing device 18 is conically tapered in the direction away from the dynamic tube member 12. This surface 41 may however be formed in any other suitable way in order to fit to the second tube 40. If the tube 40 is straight instead of tapered, the second surface 41 of the flow reducing device 18 may for instance have a cylindrical shape. As is suggested by the figure the flow reducing device is preferably mounted to the second tube 40 with a suspension device 42 including a couple of discrete suspension elements devised not to hinder or disturb the air flow.

The arrangement of the flange 30 and the flow reducing device 18 is in the embodiment of FIG. 5 similar to that of FIG. 4, with a funnel shaped increasing output opening 17. One realises however that an arrangement according to FIG. 3 could also be used. Furthermore it is possible to adapted the embodiment according to FIG. 5 to the pure embodiment according to FIG. 2, that is without the extending flange 30. In such case one will still achieve the advantage of the flow regulation not having to be performed while exercising work against the air pressure. Furthermore, the construction according to FIG. 5 can of course be supplemented with the static flow reducer 34, or be used without it.

In an alternative embodiment to that of FIG. 5, the transition between the tubes is applied at an angle. For such an angled embodiment the surface 19 basically constitutes the end surface of the conduit 13 of the tube 11,12. The second tube 40 joint to a tube 11,12 is in this embodiment devised to extend sideways from the opening 17 of the valve. With reference to FIG. 5 the tube 40 would then run essentially horizontally, or at some other angle, outwardly in one or both directions from the valve. The tube 40 then engages the valve at the lower end 14 of the stationary tube member, and at the damper surface 19, for example were a suspension device 42 is illustrated in FIG. 5. The driver means of the actuator in such an embodiment may be arranged on the inside of the end surface 19 of the conduit 13, or on the outside, with the recess made in the end surface 19 for the transmission rod 23.

Figure 7:
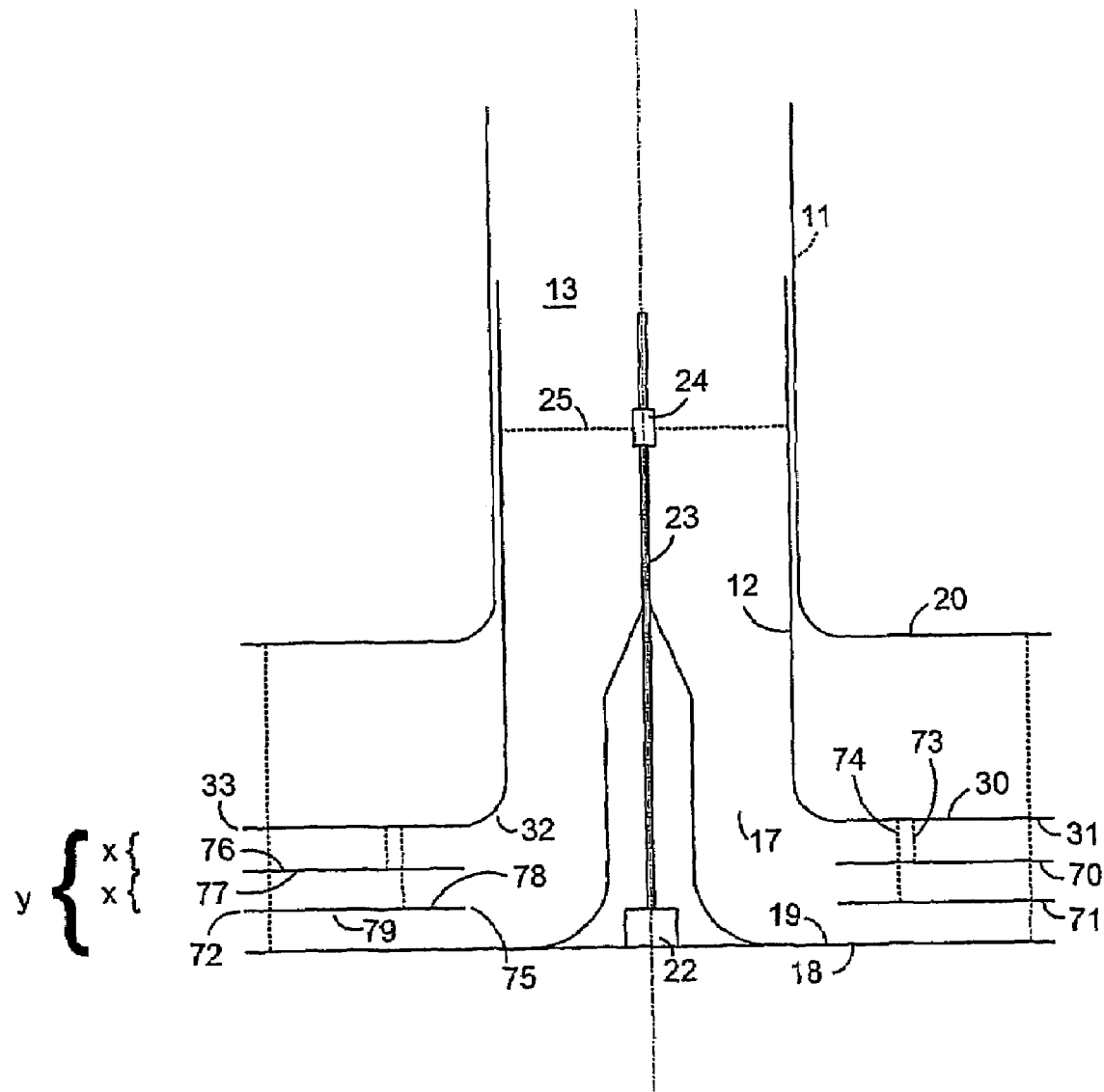
FIG. 7 shows an embodiment of the invention, wherein the total opening of the valve is split into sub openings dependent of the flow.

In FIG. 7 an embodiment of the present invention is showed, wherein the feature of the extended damping has been developed another step. In accordance with was has been previously described an elongated damping provides the advantage that the retardation of the air occurs along an extended portion with distributed formation of turbulence, a so-called "hose effect". This results in a soft retardation with considerably less generation of sound than for example a throttle damper or an iris damper, were the damping only occurs at the edge of the damper. When considering, for instance, the flow distance for arrow A in FIG. 2b, one realises that the flow speed in the passage between surfaces 19 and 31 is highest at the centre between these two surface since the retardation occurs against said surfaces. Furthermore, a person skilled in the art realises that the retardation increases the shorter the distance between surfaces 19 and 31 is. A consequence thereof is that when the distance between the surfaces increases, the influence of the hose effect will decrease, and basically disappear at some given valve opening. This brings about an increased sound generation, as the pressure reduction will essentially occur over the edge 32 of the output opening 17 or at the outer opening at the edge 33. In FIG. 7 a solution to this problem is illustrated. In this embodiment one or several damper discs 70,71 are arranged between the flange 30 and the flow reducing device 18. Each damper disc 70,71 is preferably constituted by a ring-shaped planar disc, arranged essentially parallel to surfaces 31 and 19, or if there is a small angle between the flow reducing device 18 and the flange 30, substantially in the median of this angle. Each damper surface 70,71 discloses an inner diameter 75, which preferably corresponds to or exceeds the inner diameter of the conduit 13 of the tube 11,12. The outer diameter 72 of the damper surface 70,71 preferably corresponds to the outer edge 33 of the flange 30. Each damper surface 70,71 is suspended in one or more suspension means 73,74 in the tube 11,12 or the flow reducing device 18, or in damper discs 70,71 arranged above it. In FIG. 7 an embodiment is shown wherein the suspension means 73,74 are mounted to the flange 30 on the tube, and the embodiment of FIG. 7 is of the type having a displaceable tube member 12 in relation to a firmly arranged flow reducing devise 18. A person skilled in the art realises however that the specific features of this embodiment may likewise be applied on an embodiment according to FIG. 2a.

The suspension means 73,74 are devised such that they can collapse, i.e. they have a defined maximum length between two damper elements, but an undefined minimum length. By damper element is here meant the flange 30, the flow reducing device 18, and the intermediate damper discs 70,71. Such a collapsing suspension means 73,74 may for example be implemented as a screw which in at least one damper element runs essentially freely in a recess, wherein the screw, on the outer side of the damper element, is devised with a nut which cannot pass though said recess, and thereby defines said maximum length. In a simpler embodiment the suspension means 73,74 may be implemented as a chain or a string, which by nature collapses in the absence of pulling forces. In the illustrated embodiment, all suspension means 73,74 are mounted to the flange 30. In practice, the suspension means for each damper disc 70,71 could however be mounted through its suspension means to the damper element closest above, whether it is a different damper disc 70,71 or the flange 30. Each suspension means 73,74 defines by each maximum length a maximum height x between two surfaces. This maximum height x is adjustable in dependence of the working pressure for the supply air, dimensions of the valve, and so on, by screwing down the nut on the screw 73,74, shortening the string or chain 73,74, or in some other way. Preferably all suspension means 73,74 define the same maximum distance x. At the same time the height between the surface 31 of the flange 30 and the damper surface 19 of the flow reducing device 18 defines the total opening y, under the ideal presumption that the damper discs 70,71 are infinitesimally thin. In reality the total opening is y minus the added thickness of the damper discs 70,71, but from hereon the valve according to the embodiment of FIG. 7 will be described without talking the thickness of the damper discs 70,71 into consideration.

When the valve is set for a small air flow, also the total opening y is small. For very small flows, y is less than x, i.e. all suspension means 73,74 are collapsed, and the damper discs 70,71 rest against the flow reducing device 18. In this setting it is the upper most damper 70, which by its upper surface forms the damper surface 76. For increased flow the flow reducing devise 18 and the tube are displaced away from each other, in the illustrated embodiment by displacing the dynamic tube member 12 into the stationary tube member 11. When y exceeds x the first suspension means 73 will be stretched and lift with it the upper damper disc 70. When the opening y is more than x but less than 2x, the lower damper disc 71 will remain against the flow reducing device 18. Therewith, the total opening y will be split into two openings: an upper opening with height x, limited by the flange surface 31 and the upper damper surface 76 of the upper damper disc 70, and a lower opening with height y-x, limited by the lower damper surface 77 of the upper damper disc 70 and the upper damper surface 78 of the lower damper disc 71. If an increased flow is desired the tube member 12 is displaced further up such that also the second damper disc 71 is lifted by its suspension means 74, which is the case illustrated in FIG. 7. Therewith the total opening y will be split into three openings, if y is larger than 2x and smaller than 3x, were the upper opening is unaltered from the case when y is larger than x but smaller than 2x. The middle opening will, just as the upper opening, be of height x, defined by suspension means 74. The lowest opening will be limited by the lower damper surface 79 of the damper disc 71 and the damper surface 19 of the flow reducing device 18, provided that there are no more damper discs devised between the flow reducing device 18 and the flange 30.

Preferably the number of damper discs is selected such that for a full opening, i.e. when the dynamic tube member 12 basically is displaced all the way into the stationary tube member 11 until the flange 30 engages with the ceiling 4 or the mounting flange 20, the entire opening y is divided into sub-openings each having a maximum height x. An increased opening from the scenario in FIG. 7 will thereby lead to a new damper disc being lifted up each time the opening y increases with the height x.

The arrangement according to the embodiment of FIG. 7 brings about that independent of the opening y the air flow will have to pass through an extended flow distance with a predetermined maximum height x, wherein an even pressure reduction is always obtained. The effect thereof is minimised sound generation throughout the flow interval.

As previously pointed out, this arrangement may also be obtained by means of a displaceable flow reducing device according to FIG. 2A. Furthermore, it is realised that the actuator does not have to be devised with the driver means 22 with the transmission 23,24,25, but that other types of flow regulation are conceivable. A person skilled in the arts also realises that the arrangements according to FIG. 7 may likewise be applied to the embodiments of FIGS. 3–6.

Figure 8A:
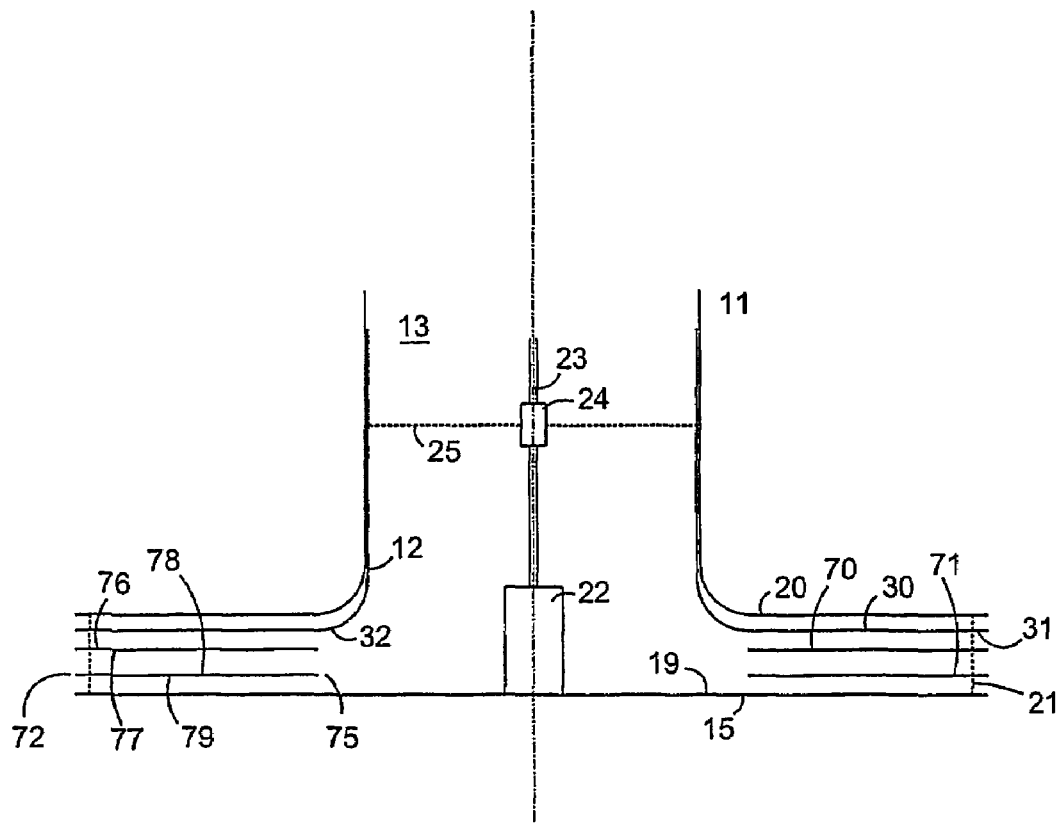
FIGS. 8a and 8b show an alternative embodiment of FIG. 7, devised for simultaneous regulation of all sub-openings.
Figure 8B:
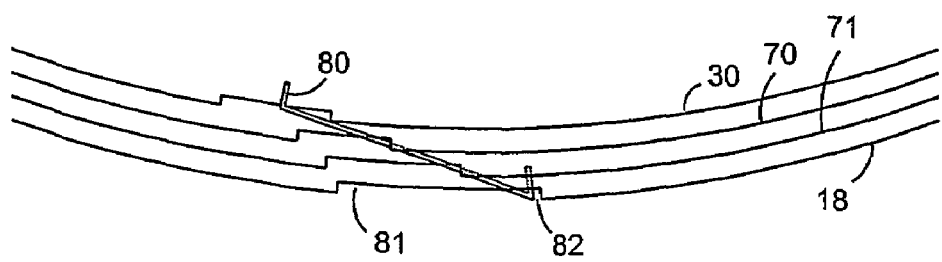

The embodiment of FIGS. 8a and 8b are similar to that of FIG. 7, but differ in one detail. Instead of arranging the terminal such that one sub-opening is opened at a time, the embodiment of FIGS. 8a and 8b uses suspension means 80 which open all gaps or sub-openings simultaneously, and at the same rate. In FIG. 8a this is illustrated by index z used for all sub-openings. In the illustrated embodiment, as shown in FIG. 8b, this function is implemented by the use of a lever 80, running in recesses 81 in each damper element 18,30,70,71. In the embodiment of FIG. 8b these recesses are made as cut-in portions at the outer edges of the damper elements, but the skilled person realises that they may just as well be formed on the inner edge, or centrally in the damper elements. The suspension arrangement according to FIG. 8b is not illustrated in FIG. 8a, but one or preferably two or more such suspension arrangements are used, preferably evenly distributed about the circumference of the terminal. The specific embodiment of FIG. 8b has a lever 80 with an elongated essentially straight mid portion with two end portions bent from the mid portion. The mid portion runs through all of the recesses 81 devised for the suspension arrangement, and each damper element rests with an edge section 82 of the recess 81 on the lever 80. Preferably the discs 70,71 are devised with other recesses for the fixation bars 21, so that the discs can move freely up and down, in a similar manner as previously described for the flange 30. This is of course also valid for the embodiment of FIG. 7. In the embodiments of FIGS. 8a and 8b the recesses (not shown) for the spacer bars 21 guarantee that the damper elements will not rotate in relation to each other, and as a result thereof slide down along the lever towards each other. The illustrated embodiment where all sub-openings are regulated simultaneously and at the same rate brings about that the flow is proportional to the actuator setting.

Figure 9A:
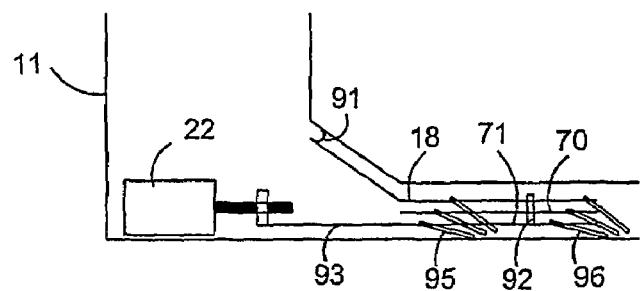
FIGS. 9a and 9b show an embodiment similar to that of FIGS. 8a and 8b, adapted for wall mounting.
Figure 9B:
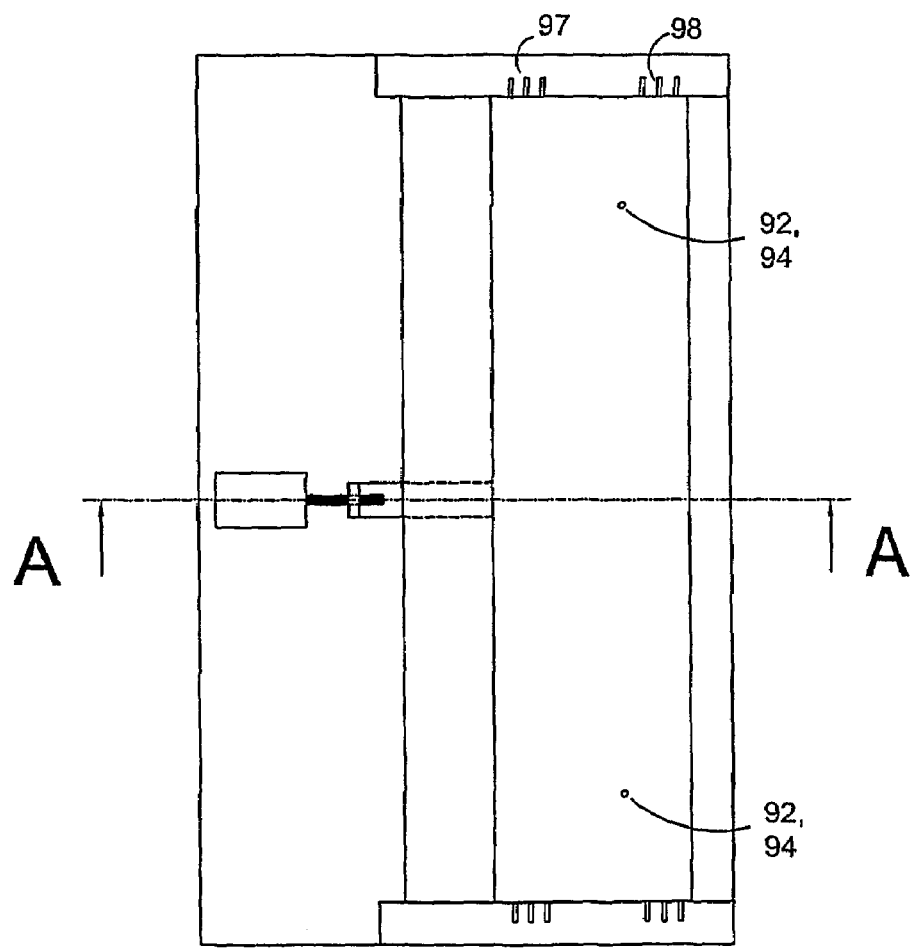

FIGS. 9a and 9b disclose an embodiment of an air supply terminal according to the invention for wall mounting. As the embodiments of FIGS. 8a and 8b, the terminal of FIGS. 9a–9b uses plural sub-openings devised to be regulated simultaneously and at the same rate. A tube 11 for supply of air ends in a narrowing space, so that the pressure reduction will not occur before the damper elements, i.e. at the extended flow distances between the flow reducing device 18, discs 70,71 and the bottom surface 90. The flow reducing device 18 is connected to the tube at one end by a foldable or resilient member 91, e.g. made of rubber. The actuator 20 is devised with a transmission 93 to displace the flow reducing device 18 and the damper discs 70,71 closer or farther away from the tube 11. By an integrating element, in the drawing exemplified with pins 92 fixed to one of the damper discs 70,71 or the flow reducing device 18 and running freely through corresponding holes 94 in the other displaceable members, the displacement of the flow reducing device 18 and the discs 70,71 is done simultaneously. FIG. 9b illustrates this embodiment from above, whereas FIG. 9a is a side view through section A—A. The discs and the flow reducing device are devised with protruding pins 97,98 at the sides, engaging with guide surfaces 95 and 96 firmly arranged in relation to the actuator 20 and tube 11. Each disc and the flow reducing device preferably has two pins per side, devised to slide against each one guide surface, in order to displace the disc or flow reducing device vertically when pulled or pushed horizontally. Preferably, as illustrated by FIG. 9a, the guide surfaces have different angles, selected such that each sub-opening will alter equally upon displacement of the discs and the flow reducing device for flow regulation purposes. Needless to say, the embodiment of FIGS. 9a and 9b is just one example of how to implement the features of the present invention on a wall mounted terminal, whereas the skilled person will surely think of alternatives within the same inventive concept.

An advantage with the terminal having plural sub-openings with narrow gaps is that the previously described hose effect is obtained throughout a large interval or range of flows. One narrow and extended flow distance, as illustrated in FIGS. 2A–6, wherein the length of the flow distance is considerably less than its width, preferably 10 times or more, brings about the effect that the retardation of the air is obtained through an extended wall friction with a small pressure gradient in the flow direction. When regulating the width of that single gap within reasonable limits, which dependent on the input pressure could be from 0 to a couple of millimetres for a flow distance of a couple of centimetres, the flow will vary with an essentially constant output speed of the air. Since the pressure drop will not fall over an edge, as in prior art supply air terminals, there will not be a concentrated turbulence effect causing the air to lose speed and simply drop down. However, when the gap increases the hose effect fades, and eventually the edge at the output opening 17 where the tube 11,12 ends will cause the major pressure reduction, with an increased noise as a result. In order to avoid this problem, i.e. to be able to retain the hose effect throughout a larger flow interval, a multiplication effect is used in accordance with the embodiments of FIGS. 7–9b. In preferred embodiments according to the drawings of FIG. 7–9b, three or more gaps or sub-openings are used. Dependent on the pressure of the input air the air terminal is adjusted to the desired flow, e.g. around 30 l/s. The multi-gap construction of these embodiments is capable of working with a wide range of input pressure. The extended flow distance defined by the length of its delimiting damper elements 18,30,70,71, are preferably between 50 and 150 mm, and in one embodiment between 70 and 100 mm. For an embodiment according to FIG. 7 or 8a, this would mean that the damper discs 70,71 have an inner diameter of the central recess corresponding to or slightly exceeding the inner diameter of the tube 11,12, which in one embodiment is about 200 mm. The outer diameter of the damper discs 70,71 exceeds their inner diameter by twice the length of the extended flow distance, as exemplified above.

For an embodiment having an extended flow distance of about 75 mm and an input pressure of 20–30 Pa, a flow of 30 l/s is reached at a total opening of 12–15 mm between the flow reducing device 18 and the flange 30, wherein each of the sub-openings have a gap width of 4–5 mm. For an input pressure of up to 100 Pa, a gap width of 1–1.5 mm is sufficient to reach 30 l/s. Such an embodiment, with a 200 mm tube 11,12, will be able to control the flow from very low flows of about 4 l/s up to at least 50 l/s at 100 Pa, with a maintained high flow speed and resulting throw with the benefits as explained below, while still keeping the generated noise to a minimum. With larger tube diameters of 250 mm or more, and potentially one more damper disc, flows of 70–80 l/s can be obtained with the same advantages.

Consequently, in comparison with the prior art technique the present invention provides distinct advantages. One advantage is that it provides the capability to cope with both the problem of noise generation and the ability to achieve a good throw of the input air leading to a satisfactory mixing of cool air, meaning that a larger temperature difference between input air and present ambient temperature can be used. The multi-disc embodiments of FIGS. 7–9b furthermore provide solutions for obtaining these advantages throughout a large flow interval. An air supply terminal embodied according to the invention will hence both save energy and provide a satisfying indoor climate at low cost. The design makes it possible to supply air as cool as 15° C. throughout the entire range of flows without causing dropping air or damping noise at low flows. In one embodiment the invention comprises one or more circular, ring-shaped discs or sheets, the distance between which is controlled such that the flow is regulated to the desired magnitude dependent on the current need. By forcing the input air to flow through the discs with a lot of wall contact with the surfaces of the discs, in comparison with the flow cross section, a gradual pressure reduction is obtained distributed along the entire flow distance through the discs. This way no or little sound or noise is generated contrary to when the pressure reduction occurs over a short distance, e.g. over an edge of a throttle damper. By using multiple discs the maximum flow can be adapted to a certain room size. In one embodiment, illustrated in FIGS. 8a and 8b, the distance or gap between the discs is increased or decreased to an equal extent during flow regulation. This results in an optimum function for adapting the gap size in dependence of the air pressure in the supply conduit or duct. At high pressure, ca 100 Pa, small gaps will give the same flow as a lower pressure with larger gaps. That the air supply terminal can be used for high pressure applications in the supply system without causing noise is an important advantage, considering that most present facilities are devised to work with a pressure of 80–90 Pa.

Another important advantage is that the air speed at the output end opening becomes almost constant independent of the magnitude of the flow, which can range from 4–75 l/s. This means that there will be no cold air dropping effect at low flows. The output speed is also important due to the resulting high self injection of the input air with the existing air present at the ceiling, which in turn has the effect that 90% of the heat exchange occurs at the ceiling, as proven by tests. The air speed decreases with proportionally with the distance from the terminal, and when it hits the wall of a medium sized office room it will already have been reduced to 0.2 m/s. Furthermore, a vertical rotation swirl is obtained, with the terminal at the centre, which swirl has an air speed of about 0.1 m/s along the floor. This means that an efficient mixing of the air obtained without resulting in a draft sensed by the people present in the room.

Tests have shown that the cooling effect with a supply air of 15° C. at a flow of 25 l/s is about 300 W, and with 35 l/s the effect becomes about 400 W. With a supply air temperature of 15° C. the temperature is up to 22° C. at the ceiling already at a distance of 1.2 m from the terminal at a room temperature of 23° C., due to the excellent self injection. Furthermore, the sound level from the terminal, as embodied according to FIGS. 8a and 8b, will be very low. Test results have shown <27 dB(A) throughout the entire flow interval. The energy consumption is reduced since the need for combined heating and cooling is reduced or eliminated, and due to the fact that in many countries the cooler outdoor air can be used during most part of the year for indoor cooling.

By the inventive design, a room size regulator is integrated with the supply air terminal. It may also control a heat valve sequentially, and may comprise a passive IR detector capable of increasing the flow from e.g. 4 l/s to 10 l/s, where 10 l/s is a standard measure often used for one person. Even a $CO_2$ sensor may be connected to and used for regulating the flow of the terminal. The base flow can be set independently for every room dependent on the heat emission from different materials, which is a major advantage for e.g. allergic people.

In a multi-room facility, such as a school or an office building, the exhaust air is preferably lead to a corridor via air transfer devices, which is extremely favourable from a financial point of view. Even the sound level is lowered about 3 dB(A) due to one less damper being used. The exhaust air from a number of rooms, e.g. 10–15, is flow balanced in the corridor.

The extended flow reduction according to the present invention, implemented by the flow reducing device 18, the flange 30, damper discs 70,71 and or the static reducer 34, results in the air pressure being reduced gradually, wherein the air resistance or turbulence is evenly distributed along the entire flow distance, whereby generation of sound is reduced to a minimum. As a consequence thereof the valve is capable of reducing and cutting off flows with an applied air pressure of more than 100 Pa. Thanks to the flow out from the valve not being impaired by the same turbulence effect as for valves according to the prior art, the valve according to the present invention is capable of spreading cooled air of about 16–17° C. along the ceiling with a throw of up to 1.5 meter. The flow is preferably controlled dependent on the needs from only a few l/s to more than 70 l/s, for example by means of sensors adapted to sense temperature, amount of $CO_2$, and so on. The invention may thus be formed to manage ventilation adapted to the needs for the entire present existence of office premises, schools and so on, as well as all new production. It has therefor the qualifications to constitute an important component in a system solution for substantial reduction of the energy need for the future.

It should however be noted that the valve construction according to the present invention is not limited to the regulation of air flows, but is also usable for any other gas. It is also apparent that the examples of dimensions given are not to be interpreted as limiting, but merely as examples in order to clarify the description. A person skilled in the art further realises that even though not illustrated in the drawings several of the described embodiments may be combined in different ways within the scope of the appended claims. This includes, e.g. the application of plural damping elements using intermediate discs 70,71 in embodiments with conical damper surfaces, and in valves adapted for implementation intermediate two joined tubes.

The invention claimed is:

1. A valve comprising:
    a tube with an axial input opening and a radial output opening;
    a flow reducing device having a damper surface facing said output opening for regulation of air flow through said tube;
    an actuator configured to adjust the distance between the damper surface of the flow reducing device and said output opening;
    a damper flange, which extends outwardly from edge of said output opening and defines a flange surface facing the damper surface, wherein an extended flow distance having a height between said flange surface and said damper surface is formed; and
    a damper disc that is configured to have a central recess, the damper disk essentially parallel to and between said damper flange and the flow reducing device to define parallel and extended flow passages with sub-openings between said flange surface and said damper surface.

2. The valve according to claim 1, further comprising a suspension element connected to the damper disk, the suspension element configured to limit height of the sub-opening for each flow passage to no more than a predetermined maximum height.

3. The valve according to claim 2, wherein the suspension element is further configured to position said damper disc adjacent at least one of said flange surface and said damper surface when the distance between said flange surface and said damper surface is less than said predetermined maximum height.

4. The valve according to claim 2, wherein the suspension element is further configured to position said damper disc at said predetermined maximum height from at least one of said flange surface and said damper surface when the distance between said flange surface and said damper surface is greater than said predetermined maximum height.

5. The valve according to claim 1, wherein said damper disc has a flat ring-shaped portion facing said flange surface of said damper flange, and further comprising means for varying a distance between the flange surface and said damper disc to adjust a width of the extended flow passages of said sub-openings and flow through the valve.

6. The valve according to claim 1, further comprising a plurality of damper discs in parallel between the damper flange and the flow reducing device.

7. The valve according to claim 6, further comprising means for limiting the distance between adjacent ones of said plurality of damper disks to said predetermined maximum height.

8. The valve according to claim 1, wherein said damper disc is mounted to said damper flange by a collapsing suspension element.

9. The valve according to claim 1, wherein said tube comprises a dynamic tube member with opened ends, displaccably arranged concentrically with said stationary tube member, wherein said actuator is configured to displace said dynamic tube member along the stationary tube member to adjust the distance between said output opening and said damper surface.

10. The valve according to claim 9, wherein said flow reducing device comprises spacer bars arranging the damper surface at a predetermined distance from said stationary tube member.

11. The valve according to claim 1, further comprising a suspension element connected to the damper disk, the suspension element configured to adjust height of the sub-opening for each flow passage simultaneously so as to adjust output fluid flow from the valve.

12. The valve as recited in claim 11, wherein the suspension element is further configured to adjust the height of the sub-opening for each flow passage at the same rate.

13. The valve according to claim 11, wherein the suspension element comprises a lever which interconnects the tube, the damper disk, and the flow reducing, device.

14. A valve comprising:
- a tube with an input opening and an output opening;
- a flow reducing device having a damper surface facing said output opening for regulation of air flow through said tube;
- an actuator entirely contained within said tube and configured to adjust the distance between the damper surface of the flow reducing device and said output opening;
- a damper flange, which extends outwardly from an edge of said output opening and defines a flange surface facing the damper surface, wherein an extended flow distance having a height between said flange surface and said damper surface is formed; and
- a damper disc that is configured to have a central recess, the damper disk essentially parallel to and between said damper flange and the flow reducing device to define parallel and extended flow passages with sub-openings between said flange surface and said damper surface.

* * * * *